(No Model.)

S. BOOKER.
RAKE.

No. 295,103. Patented Mar. 11, 1884.

WITNESSES
Samuel E Thomas.
N. S. Wright.

INVENTOR
Samuel Booker
By W. W. Leggett.
Attorney

UNITED STATES PATENT OFFICE.

SAMUEL BOOKER, OF TIFFIN, OHIO, ASSIGNOR OF ONE-HALF TO ROBERT TSCHUMY, OF SAME PLACE.

RAKE.

SPECIFICATION forming part of Letters Patent No. 295,103, dated March 11, 1884.

Application filed May 1, 1883. (No model.)

*To all whom it may concern:*

Be it known that I, SAMUEL BOOKER, of Tiffin, county of Seneca, State of Ohio, have invented a new and useful Improvement in the Manufacture of Rakes; and I declare the following to be a full, clear, and exact description of the same, such as will enable others skilled in the art to which it pertains to make and use it, reference being had to the accompanying drawings, which form a part of this specification.

My invention consists in the improved construction of rake hereinafter described, and more particularly pointed out in the claim.

Figure 1:
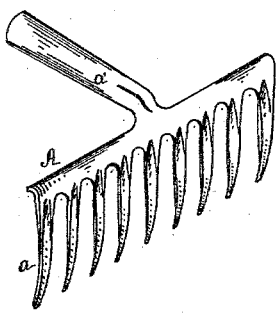
Figure 2:
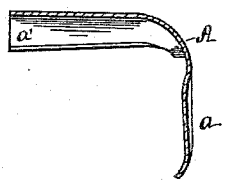
Figure 3:
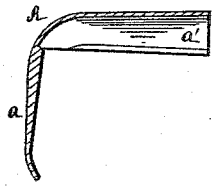
Figure 4:
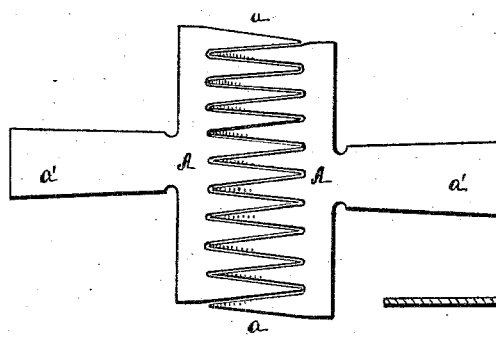
Figure 5:
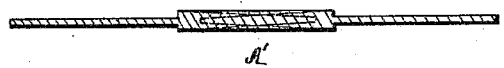

In the drawings, Figure 1 is a perspective view of a rake embodying my invention. Fig. 2 is a vertical section. Fig. 3 is a similar section of a variation. Fig. 4 is a plan view, and Fig. 5 is a cross-section illustrating the manner of cutting out the blanks.

My invention relates to the manufacture of rakes, and has for its object the improved construction of rakes, whereby the rake-head and teeth are materially strengthened and their durability considerably increased.

In the drawings, A indicates the head of the rake; a, the teeth; a', the shank. A' indicates a suitable sheet of metal from which the rake is cut. I design to have the sheet metal of steel or other suitable material rolled to the desired width and thickness. The sheet of metal is then placed under a suitable die-punch, and the rake-head with the teeth and shank integral therewith are cut by one and the same impression of the die. After being suitably cut, the shank is brought into the desired tubular form. The head of the rake is curved in cross-section from its junction with the teeth to its upper edge, whereby the rake-head is materially strengthened and its durability considerably increased. The shaping of the rake after it is cut into blanks out of the sheet metal may be done in any proper manner—as, for instance, by drop-dies or presses of suitable form.

As shown in Fig. 4, the blanks cut from the sheet metal may conveniently be cut in reversed position, the teeth of one blank conforming to the spaces between the teeth in the opposite blank, thus saving material; but this forms no part of my invention.

If desired, the steel can be rolled in such a manner that the teeth shall be of any desired thickness from front to back.

As shown in Fig. 5, the metal may be rolled thicker in the middle, with special reference to securing teeth of any desired heft or thickness, as shown in Fig. 3. The sheet metal may, however, be rolled thinner, if desired; but in either case the teeth are ribbed or convexed on their inner sides or working faces, as illustrated in Figs. 1 and 2, whereby they are materially strengthened and rendered more durable.

I am aware that rakes have been cut from metal with the teeth and rake-head integral, the top edge of the cross-head flanged, and therefore I do not broadly claim such; but,

Having thus described my invention, what I claim is—

As an article of manufacture, a sheet-metal rake having the rake-head, teeth, and shank integral, the head of the rake being curved in cross-section, and the teeth convexed on their inside or working faces, substantially as described.

In testimony whereof I sign this specification in the presence of two witnesses.

SAMUEL BOOKER.

Witnesses:
C. M. POMEROY,
OLIVER C. FEW.